Feb. 28, 1961 N. S. REYNOLDS 2,973,231
PISTON ASSEMBLY FOR HYDRAULIC BRAKE MASTER CYLINDER
Filed May 26, 1958
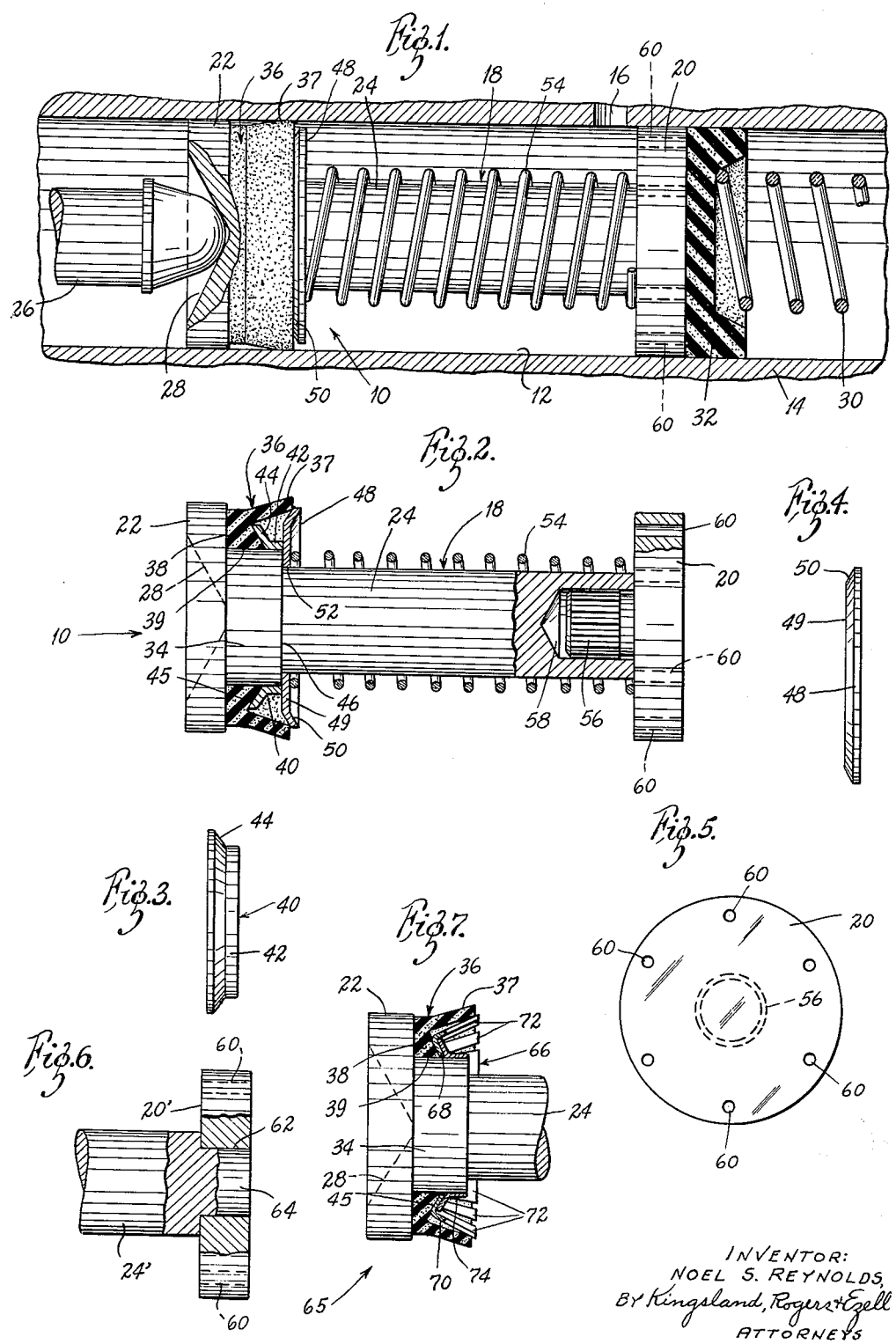
INVENTOR:
NOEL S. REYNOLDS,
BY Kingsland, Rogers & Ezell
ATTORNEYS

United States Patent Office 2,973,231
Patented Feb. 28, 1961

2,973,231

PISTON ASSEMBLY FOR HYDRAULIC BRAKE MASTER CYLINDER

Noel S. Reynolds, 636 Sherwood Drive, Webster Groves, Mo.

Filed May 26, 1958, Ser. No. 737,865

15 Claims. (Cl. 309—33)

The present invention relates generally to hydraulic brake master cylinders, and more particularly to an improved spool-type piston assembly for a brake master cylinder arrangement in which compensating hydraulic fluid is introduced through the piston head.

Although spool-type pistons having perforated pressure heads are broadly known in the master cylinder art, the problem of fluid leakage past the nonperforated follow-up heads has heretofore proved a serious detriment to wide-spread adoption of this potentially superior arrangement. Such pistons have in the past been made in one piece, which precludes the assembly of non-stretchable auxiliary ring-like parts between the spaced heads. Applicant overcomes this difficulty by a two-piece piston construction which enables the incorporation of efficient sealing elements. Moreover, the two-piece piston lends itself to more economical production by such methods as impacting, cold forging, die casting, and powder metallurgy, which eliminate costly finishing operations normally employed in the production of one-piece pistons.

Hence, it is an object of the present invention to provide a brake master cylinder employing a substantially nonleaking spool-type piston.

It is another object of the invention to provide a spool-type piston assembly which incorporates an annular seal between the piston heads adapted to produce predetermined pressure engagement with a cylinder bore.

It is another object of the invention to provide a spool-type piston assembly which incorporates a flexible seal and a spring-biased expander for the seal.

It is another object of the invention to provide a two-piece piston having spaced heads and incorporating a predeterminately biased annular sealing ring between the heads.

It is another object of the invention to provide retaining means for locking a secondary seal cup in leak-proof position on a spool-type piston.

It is another object of the invention to provide means for limiting the degree of expansion of a ring seal.

It is another object to provide a spool-type piston construction which lends itself to simple assembly of auxiliary elements and which is economical to manufacture.

The foregoing, along with the additional objects and advantages will be apparent from the following description of a specific embodiment of the invention, as depicted in the accompanying drawing, in which:

Figure 1 is a fragmentary cross-sectional view, partly in elevation, showing a piston assembly of the present invention disposed in the bore of a brake master cylinder;

Figure 2 is a view, partly in elevation and partly in section, showing preferred structural details in the arrangement of the piston assembly of Figure 1;

Figure 3 is a side elevation of a removed retainer;

Figure 4 is a side elevation of a removed expander;

Figure 5 is an end view of the piston assembly of Figure 2 as viewed from the right of the latter figure;

Figure 6 is a fragmentary view, partly in elevation and partly in section, showing a modified arrangement of the piston assembly; and Figure 7 is a fragmentary view similar to the left end of Figure 2, but showing a modified construction employing a one-piece expander.

Directing attention more particularly to Figure 1, a piston assembly designated generally by the numeral 10 is shown slidably disposed in a cylindrical bore 12 formed in a metal housing 14 depicted fragmentarily. The housing 14 is of a well-known type which includes a passage 16 which communicates the bore 12 with a surmounting reservoir chamber (not shown).

The piston assembly 10 includes a rigid spool-like assembly 18 comprising a pressure head 20 and a follow-up head 22 interconnected by an elongated stem 24. As is illustrated in Figure 1, the passage 16 in the wall of the cylinder bore 12 is located so as to communicate with the space between the aforesaid heads 20 and 22 of the piston 18. It may further be mentioned that the illustration of Figure 1 shows the piston 18 fully retracted to the left, from which position it may be advanced toward the right a maximum distance which is somewhat less than the spacing between the heads 20 and 22. An actuating rod 26 engages a depression 28 formed in the external face of the follow-up head 22 and is operable by familiar means (not shown) to advance the piston assembly 10 to the right against the compressive force of a helical spring 30 which biases the assembly 10 toward its illustrated position of rest. A cup-like seal 32 is interposed between the spring 30 and the forward face of the pressure head 20.

Figure 2 illustrates one preferred arrangement of the piston assembly 10 wherein the stem 24 is formed integrally with the follow-up head 22. At the end where it adjoins the head 22, the stem 18 has a cylindrical enlargement 34 adapted to receive an annular seal 36 formed of resilient rubber-like material. The sealing ring 36 has a uniform cross-sectional shape which includes an axially extended peripheral skirt portion 37. The remaining cross section, including a rear annular face 38 and a central bore 39, is such that flush contact may be made with the forward face of the follow-up head 22, as well as with the cylindrical enlargement 34. A ring-like retainer 40, shown removed in Figure 3, has a short tubular portion 42 and a flared frusto-conical skirt portion 44, as best illustrated in Figure 2. The inside diameter of the tubular portion 42 is such as to provide a press-fit with the enlargement 34, and the flared portion 44 engages a correspondingly shaped inner portion 45 of the seal ring 36 so as to compress the latter both against the cylindrical enlargement 34 and against the forward face of the follow-up head 22. The lengths of the associated parts, including the length of the enlargement 34, are coordinately selected to provide a predetermined minimum compression of the seal member. The enlargement 34 terminates in an annular shoulder 46, and it will be understood that the retainer 40 is pressed onto the enlargement 34 so as to have its adjacent end flush with the shoulder 46.

An expander 48, shown removed in Figure 4, is ring-like in form and has a washer-like inner portion 49 terminating in a peripheral flared portion 50 providing the cross-sectional shape clearly illustrated in Figure 2. The central aperture 52 of the expander 48 is such as to provide a free sliding fit with the stem 24, and the outside diameter of the expander 48 is preferably very slightly less than that of the heads 20 and 22 of the piston 18.

In assembly with the piston 18, the expander 48 is oriented with the convex side of the flared portion 50 disposed toward the follow-up head 22 so as to engage the inside edge of the skirt portion 37 of the seal ring 36. It will be noted from Figure 2 that the skirt portion 37 extends axially beyond the shoulder 46 of the enlargement 34 so that, with the expander 48 positioned against the shoulder 46, the skirt portion 38 is biased outwardly toward a position radially beyond the diameter of the follow-up head 22. A compression spring 54 is assembled onto the stem 24 so as to be confined between the movable expander 48 and the fixed pressure head 20. It is to be understood that the force of the biasing spring 54 and the angle of flare of the peripheral portion 50 of the expander 48 are coordinately selected so as to provide a predetermined appropriate pressure of the skirt portion 37 of the seal 36 against the cylindrical bore 12 of the housing 14.

The pressure head 20 is of generally disc-like form having a central axially extending lug 56 for pressed engagement into a well 58 provided at the free end of the stem 24. A ring of axial perforations 60 is formed in the pressure head 20 as illustrated in Figures 2 and 5.

Figure 6 illustrates a modified arrangement in which a pressure head 20' has a central aperture 62 for receiving a cylindrical lug extension 64 provided at the free end of a piston stem 24'.

Figure 7 illustrates a modified construction 65 which differs from the assembly 10 in that the expander 48 and the compression spring 54 are replaced by a one-piece expander 66. The member 66 is generally ring-shaped and has a cross section which, as illustrated comprises an inner frusto-conical portion 68, for interfit with the similarly shaped portion 45 of the seal ring 36, and an outer frusto-conical portion 70 made up of resilient tab-like spring segments 72, for biasing engagement with the seal flange 37. The expander 66 is secured in predetermined compression with the seal portion 45 by means of a retainer 74 which differs from the previously described retainer 40 only in dimensional changes dictated by interposition of the expander 66 between the members 36 and 74.

In use, either of the piston assemblies 10, or 65 with its various components assembled as above described and as clearly illustrated in the drawing, are disposed in the bore 12 of the master cylinder housing 14. Thus disposed, the particular assembly can be advanced to the right by means of the actuating rod 26 and returned to its illustrated rest position by action of the spring 30, this general mode of operation being well-known in the brake cylinder art. It may be noted, incidentally, that the diameter of the compression spring 30 is less than the diameter of the hole circle defined by the apertures 60 in the pressure head 20. Thus, in the absence of substantial fluid pressure against the forward face of the seal, the radially outermost portion of the seal may not effectively close the apertures 60. In this way, the illustrated arrangement makes use of the partial vacuum created by return movement of the piston assembly 10 and its end cup 32 to draw in a flow of compensating hydraulic fluid through the passage 16 and the apertures 60. The fluid thus introduced into the pressure chamber ahead of the cup-like member compensates for any loss within the pressure system. The space between the pressure head 20 and the seal ring 36 remains constantly filled with hydraulic fluid, the predeterminately biased engagement of the skirt portion 37 of the member 36 serving to provide an efficient seal against leakage to the rear of the assembly 10.

It is recognized that spool-type pistons incorporating flexible sealing rings have been used heretofore for the purpose of preventing leakage outside the master cylinder. Inasmuch, however, as these uses have been generally ineffective, the novel incorporation of means firmly securing the ring in pressure engagement with the piston and, at the same time, biasing the skirt of the seal into predetermined pressure engagement with the wall of the cylinder bore as above described is submitted to be a material advance in this art.

Clearly, there has been provided a piston assembly for brake master cylinders which fulfills the objects and advantages sought therefor.

The foregoing description and the accompanying drawing have been given only by way of illustration and example. It is to be understood, therefore, that changes in the form of the elements, rearrangement of parts, and the substitution of equivalent elements, all of which will be apparent to those skilled in the art, are contemplated as being within the scope of the invention, which is limited only by the claims which follow.

What is claimed is:

1. A piston assembly for a hydraulic brake master cylinder comprising, in combination, a spool having spaced heads interconnected by an elongated stem, means for biasing said spool in a pressure applying direction and means for biasing said spool in a return direction, a circular sealing member of flexible rubber-like material disposed over a portion of said stem adjacent one of said heads, said sealing member having an expandable peripheral portion, and means including resilient spring means separate from either of said biasing means for biasing said portion toward an expanded position.

2. The combination of claim 1 wherein the expandable peripheral portion of the circular sealing member takes the form of an axially directed flexible annular flange, and wherein the means for biasing said portion includes a ring-like expander disposed on the piston stem and having a frusto-conical peripheral flange for engaging the free edge of said flexible flange.

3. The combination of claim 2 wherein the stem which interconnects the spaced piston heads incorporates stop means for limiting the biasing action of the expander.

4. The combination of claim 3 wherein the aforesaid stop means comprises an enlarged cylindrical portion of the piston stem, said enlarged portion being adjacent the piston head and providing an inner cylindrical seat for the seal member.

5. The combination of claim 4 wherein a ring-like retainer is secured about the enlarged stem portion for retaining the seal member thereon.

6. In a piston assembly for a hydraulic cylinder, in combination, a piston member having a piston head, and depending coaxially therefrom an elongated stem, said stem including a cylindrical enlargement adjacent the head, a ring-like seal member of resilient rubber-like material disposed about said enlargement and against the adjacent head, and ring-like retaining means secured to said enlargement for compressively retaining said seal member against both the cylindrical enlargement and the adjacent piston head.

7. The combination of claim 6 wherein the seal member has a transverse annular face at one end, a generally axially extended peripheral flange at the other end, a cylindrical inside surface, and a convex frusto-conical surface intermediate said flange and said inside surface, and wherein the retaining means includes a member having a concave frusto-conical surface for compressive engagement with the correspondingly shaped surface of the sealing member.

8. The combination of claim 7 wherein the retaining member has a sleeve-like extension for press-fitted engagement with the enlarged portion of the piston stem, and wherein the length of said extension, the length of the inside cylindrical surface of the seal member, and the length of the cylindrical stem enlargement are coordinately selected to provide predetermined minimum compression of the seal member between the enumerated element surfaces.

9. The combination of claim 8 plus means for biasing the flange of the seal member in a radially outward direction, said latter means comprising an expander ring having a convex frusto-conical surface for engaging the free edge of said seal flange.

10. The combination of claim 9 wherein the convex frusto-conical surface of the expander ring comprises tab-like spring segments in resilient engagement with the seal flange.

11. The combination of claim 9 wherein the expander ring comprises a rigid annular ring, and a helical spring disposed about the piston stem between said ring and the remote piston head.

12. In a piston assembly for a hydraulic cylinder, in combination, an elongated stem having an integral piston head at one end, means for biasing said stem and piston head in a pressure applying direction and means for returning said stem and piston head after it has been moved by said first-mentioned biasing means, a resilient sealing ring disposed about said stem and against said head, an expander ring separate from either of said stem and piston head biasing means having a rigid central annulus disposed about said stem and against said sealing ring for expanding said sealing ring, and a second piston head affixed to the free end of said stem.

13. The combination of claim 12 wherein the second-mentioned piston head has an axial lug, and wherein the free end of the piston stem has an axial well for receiving said lug in press-fitted engagement.

14. The combination of claim 12 wherein the second-mentioned piston head has a central aperture, and wherein the free end of the piston stem has a portion of reduced diameter for press-fitted engagement in said aperture.

15. The combination of claim 12 plus a coil spring disposed about the stem between the expander ring and the second piston head.

References Cited in the file of this patent

UNITED STATES PATENTS

| | | |
|---|---|---|
| 2,059,729 | Dick | Nov. 3, 1936 |
| 2,060,847 | Bowen | Nov. 17, 1936 |
| 2,161,277 | Bowen | June 6, 1939 |
| 2,232,350 | Swift | Feb. 18, 1941 |
| 2,349,345 | Goepfrich | May 23, 1944 |
| 2,454,036 | Clayton-Wright | Nov. 16, 1948 |
| 2,577,153 | Pratt et al. | Dec. 4, 1951 |
| 2,701,155 | Estel | Feb. 1, 1955 |